(12) United States Patent
Dirsa et al.

(10) Patent No.: US 10,795,538 B2
(45) Date of Patent: Oct. 6, 2020

(54) CUSTOMIZED DESIGN FOR AN ARTICLE OF FOOTWEAR

(71) Applicant: NIKE, Inc., Beaverton, OR (US)

(72) Inventors: David J. Dirsa, North Andover, MA (US); Clifford B. Gerber, Hillsboro, OR (US); Petre Gheorghian, Portland, OR (US); E. Scott Morris, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 16/782,186

(22) Filed: Feb. 5, 2020

(65) Prior Publication Data

US 2020/0174645 A1   Jun. 4, 2020

Related U.S. Application Data

(63) Continuation of application No. 16/249,040, filed on Jan. 16, 2019, now Pat. No. 10,592,069, which is a continuation of application No. 15/863,161, filed on Jan. 5, 2018, now Pat. No. 10,228,817, which is a continuation of application No. 14/719,621, filed on May 22, 2015, now Pat. No. 9,898,160, which is a continuation of application No. 13/327,280, filed on Dec. 15, 2011, now Pat. No. 9,070,160.

(51) Int. Cl.
| | | |
|---|---|---|
| *G06F 3/0481* | (2013.01) | |
| *G06F 3/0484* | (2013.01) | |
| *G06Q 30/06* | (2012.01) | |
| *G06T 3/00* | (2006.01) | |
| *A43B 3/00* | (2006.01) | |

(52) U.S. Cl.
CPC ........ *G06F 3/04817* (2013.01); *A43B 3/0078* (2013.01); *G06F 3/04842* (2013.01); *G06Q 30/0621* (2013.01); *G06Q 30/0643* (2013.01); *G06T 3/005* (2013.01); *A43D 2200/60* (2013.01)

(58) Field of Classification Search
None
See application file for complete search history.

(56) References Cited

U.S. PATENT DOCUMENTS

| | | |
|---|---|---|
| 5,128,880 A | 7/1992 | White |
| 5,195,030 A | 3/1993 | White |
| 5,216,594 A | 6/1993 | White et al. |
| 5,237,520 A | 8/1993 | White |
| 5,339,252 A | 8/1994 | White et al. |
| 6,366,281 B1 | 4/2002 | Lipton et al. |
| 6,411,338 B1 | 6/2002 | Neill |
| 7,216,092 B1 | 5/2007 | Weber et al. |
| 7,467,349 B1 | 12/2008 | Bryar et al. |

(Continued)

OTHER PUBLICATIONS

Feb. 21, 2014—(WO) ISR & WO—App. No. PCT/US12/067736.

(Continued)

*Primary Examiner* — James A Thompson
(74) *Attorney, Agent, or Firm* — Banner & Witcoff, Ltd.

(57) ABSTRACT

A method of making an article of footwear is disclosed. The method includes the steps of providing a customer with a pre-selected set of graphics, allowing a customer to choose a set of input graphics, and generating a set of morphed graphics based on a set of input graphics. The user can select a morphed graphic and apply it to an article. The method may further include the step of limiting the number of times a customized graphic may be selected and applied to an article.

20 Claims, 15 Drawing Sheets

(56) References Cited

U.S. PATENT DOCUMENTS

| | | |
|---|---|---|
| 7,945,343 B2 | 5/2011 | Jones et al. |
| 8,214,766 B1 | 7/2012 | Berger et al. |
| 8,418,068 B1 | 4/2013 | Backus et al. |
| 9,009,614 B2 | 4/2015 | Dirsa et al. |
| 9,070,160 B2 | 6/2015 | Dirsa et al. |
| 2002/0085046 A1 | 7/2002 | Furuta et al. |
| 2002/0103714 A1 | 8/2002 | Eze |
| 2005/0071935 A1 | 4/2005 | Shah et al. |
| 2005/0090928 A1 | 4/2005 | Gibson |
| 2005/0143174 A1 | 6/2005 | Goldman et al. |
| 2005/0177453 A1 | 8/2005 | Anton et al. |
| 2005/0286799 A1 | 12/2005 | Huang et al. |
| 2006/0001682 A1 | 1/2006 | Honda |
| 2006/0052892 A1 | 3/2006 | Matsushima et al. |
| 2007/0043630 A1 | 2/2007 | Lyden |
| 2007/0208633 A1 | 9/2007 | Singh |
| 2007/0282666 A1 | 12/2007 | Afeyan et al. |
| 2008/0010867 A1 | 1/2008 | Davis |
| 2008/0126981 A1 | 5/2008 | Candrian et al. |
| 2008/0147219 A1 | 6/2008 | Jones et al. |
| 2008/0189194 A1 | 8/2008 | Bentvelzen |
| 2008/0220850 A1 | 9/2008 | Pacey |
| 2009/0001682 A1 | 1/2009 | Yamashita et al. |
| 2009/0249177 A1 | 10/2009 | Yamaji et al. |
| 2010/0005686 A1 | 1/2010 | Baum |
| 2010/0010893 A1 | 1/2010 | Rajaraman et al. |
| 2010/0036753 A1 | 2/2010 | Harvill et al. |
| 2010/0121739 A1 | 5/2010 | McCarthy |
| 2010/0180469 A1 | 7/2010 | Baucom et al. |
| 2010/0236105 A1 | 9/2010 | Almaguer |
| 2010/0287515 A1 | 11/2010 | Hedman et al. |
| 2010/0289971 A1 | 11/2010 | Odland et al. |
| 2010/0318442 A1 | 12/2010 | Paul et al. |
| 2011/0050886 A1 | 3/2011 | Thompson et al. |
| 2011/0083341 A1 | 4/2011 | Baum |
| 2011/0172797 A1 | 7/2011 | Jones et al. |
| 2011/0183739 A1 | 7/2011 | Ansari et al. |
| 2011/0184725 A1 | 7/2011 | Connor |
| 2011/0191204 A1 | 8/2011 | Litke et al. |
| 2011/0192049 A1 | 8/2011 | Auger et al. |
| 2011/0261071 A1 | 10/2011 | Ganetakos et al. |
| 2012/0144330 A1 | 6/2012 | Flint |
| 2015/0196098 A1 | 7/2015 | Dirsa et al. |

OTHER PUBLICATIONS

May 12, 2014—(WO) ISR & WO—App. No. PCT/US12/067742.
Abrosoft "About the User Interface—Photo Morphing Software for Creation of Morphing Picturers and Animations", Sep. 25, 2011 (Sep. 25, 2011), XP055588563, Retrieved from the Internet, URL https://web.archive.org/web/20110925070118/http://www.fantamorph.com/lesson8.html [retrieved on May 14, 2019].

CUSTOMIZED DESIGN FOR AN ARTICLE OF FOOTWEAR

CROSS-REFERENCE TO RELATED APPLICATIONS

This application is a continuation of U.S. patent application Ser. No. 16/249,040, filed Jan. 16, 2019, which is a continuation of U.S. patent application Ser. No. 15/863,161, filed Jan. 5, 2018, now U.S. Pat. No. 10,228,817, which is a continuation of U.S. patent application Ser. No. 14/719,621, filed May 22, 2015, now U.S. Pat. No. 9,898,160, which is a continuation of U.S. patent application Ser. No. 13/327,280, filed Dec. 15, 2011, now U.S. Pat. No. 9,070,160. The contents of each of the above-identified applications are expressly incorporated herein by reference in their entireties for any and all non-limiting purposes.

BACKGROUND

The embodiments relate generally to footwear, and in particular to a method of making an article of footwear.

Articles of footwear may generally comprise an upper and a sole. The sole may include an outsole, a midsole and/or an insole. The upper may be used to secure the sole to the foot.

SUMMARY OF THE INVENTION

A method of making an article of footwear is disclosed. In one aspect, the embodiments provide a method of customization for an article, comprising: receiving information related to a first selected graphic; receiving information related to a second selected graphic; generating a morphed graphic based on information related the first selected graphic and the second selected graphic; and providing a customized article including the morphed graphic.

In another aspect, the embodiments provide a method of customization for an article, comprising: receiving information related to a first selected graphic; receiving information related to a second selected graphic; receiving a user selected value; generating a morphed graphic using information from the first selected graphic and the second selected graphic according to the user selected value; and providing a customized article including the morphed graphic.

In another aspect, the embodiments provide a method of customization for an article, comprising: receiving a user selected customized graphic; determining if a limit for the customized graphic has been reached; allowing the user selected customized graphic to be applied to an article if the limit has not been reached; and preventing the user selected customized graphic from being applied to an article if the limit has been reached.

In another aspect, the embodiments provide a method of customization for an article, comprising: receiving information related to a first selected graphic; receiving information related to a second selected graphic; generating a plurality of morphed graphics using information from the first selected graphic and the second selected graphic; receiving a user selected graphic from plurality of morphed graphics; and providing a customized article including the user selected morphed graphic.

In another aspect, the embodiments provides a method for customization of an article, comprising: receiving a user customized graphic; receiving a user availability preference associated with the user customized graphic; determining if the user wants to share the user customized graphic; allowing the customized graphic to be used by at least one other customer when the user wants to share the customized graphic; and otherwise preventing the customized graphic to be used by any other customer.

Other systems, methods, features and advantages of the embodiments will be, or will become apparent to one with skill in the art upon examination of the following figures and detailed description. It is intended that all such additional systems, methods, features and advantages be included within this description, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION OF THE EMBODIMENTS

Figure 1:
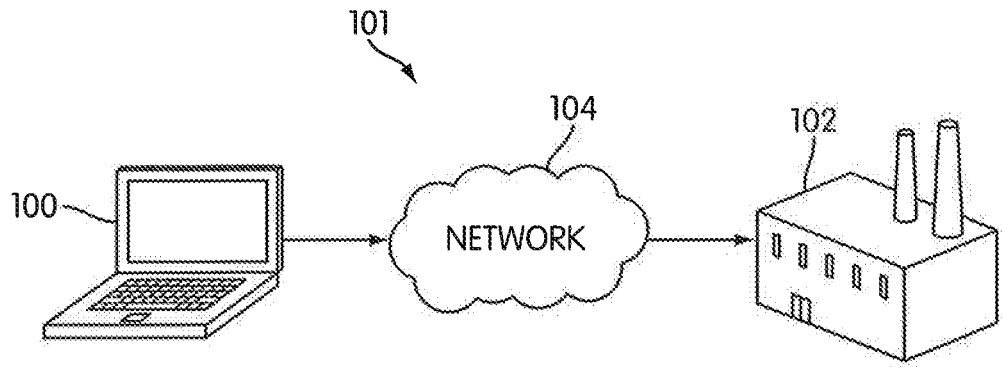
FIG. 1 is a schematic view of an illustrative embodiment of a customization system.

FIG. 1 is a schematic diagram of an illustrative embodiment of customization system 101. The term "customization system", as used throughout this detailed description, refers to a system for manufacturing articles of footwear that include a customized design of some kind. In some embodiments, the article may be customized by the manufacturer or a third party designer. In one embodiment, the article may be customized by the party purchasing the articles of footwear.

In one embodiment, customization system 101 comprises remote terminal 100 connected to vendor 102 by way of network 104. Generally, remote terminal 100 may be any type of computer, including either a desktop or a laptop computer. In other embodiments, remote terminal 100 may be any type of device that includes a display, a processor, and an ability to transmit and receive data from a remote network. Examples of such devices include, but are not limited to, PDA's, cell phones, as well as other types of devices.

In this embodiment, vendor 102 represents a manufacturing system configured to manufacture articles of footwear. Here, vendor 102 is shown as a single building for illustrative purposes only. In many cases, vendor 102 will comprise many buildings. In some cases, vendor 102 may comprise many buildings that are disposed in different geographic locations. Generally, the term "vendor", as used here, may also refer to distributors and/or suppliers. In other words, the term "vendor" may also apply to various operations on the manufacturing side, including the operations responsible for parts, labor, and/or retail of the article of footwear, as well as other manufacturing side operations.

In some cases, network 104 is configured to relay information between remote terminal 100 and vendor 102. Generally, network 104 may be a system allowing for the exchange of information between remote terminal 100 and vendor 102. Examples of such networks include, but are not limited to, personal area networks, local area networks, wide area networks, client-server networks, peer-to-peer networks, as well as other types of networks. Additionally, network 104 may support wired transmissions, wireless transmissions, or both wired and wireless transmissions. In some embodiments, network 104 may be a packet-switched communications system. In one embodiment, network 104 may be the Internet.

Figure 2:
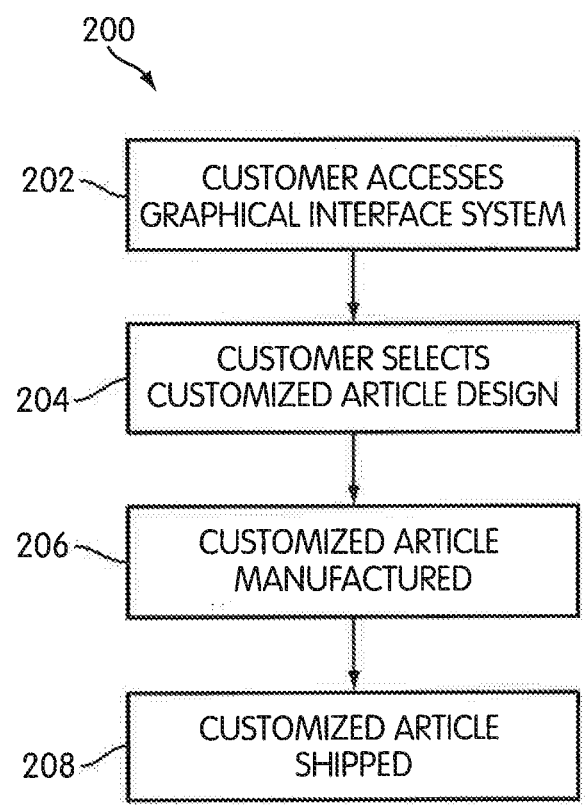
FIG. 2 is an embodiment of a process for a customization system.

Referring to FIG. 2, customization system 101 may include provisions that allow a customer to design an article of footwear that will be produced by a vendor. Process 200 is an embodiment of a process of how customization system 101 may proceed. During first step 202, a customer may interact with a website in order to access the graphical interface system. Once the customer has accessed the graphical interface system, the customer may select a customized article design in second step 204. Following this, the customized article of footwear may be manufactured according to the customer's design during third step 206. Finally, during fourth step 208, the customized article may be shipped to a pre-designated address supplied by the customer.

Figure 3:
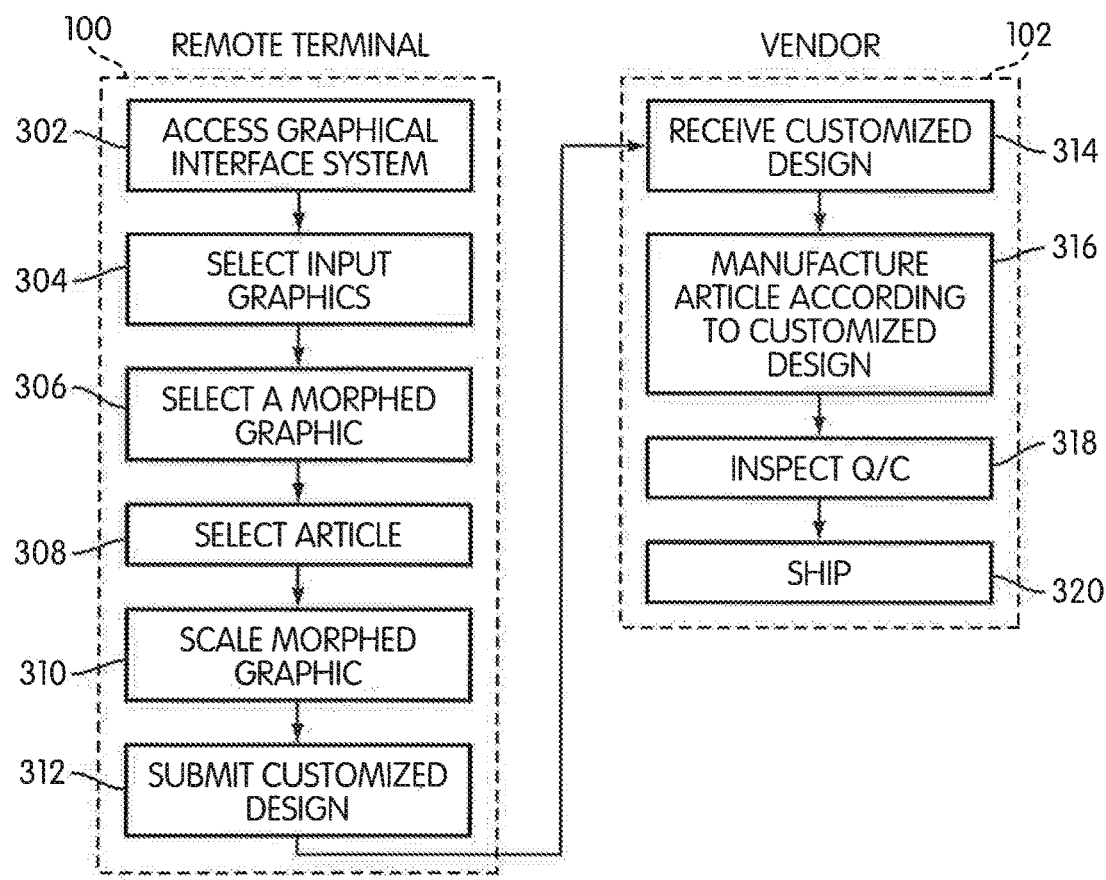
FIG. 3 is an embodiment of a detailed process for a customization system.

Referring to FIG. 3, customization system 101 may be best understood by separating the steps associated with remote terminal 100 and those associated with vendor 102. In some cases, those steps associated with remote terminal 100 are performed on or by remote terminal 100 and those steps associated with vendor 102 are performed on or by vendor 102. However, this is not necessarily the case, and some of the steps associated with remote terminal 100 may be performed on or by vendor 102 or some other resource, and some of the steps associated with vendor 102 may be performed on or by remote terminal 100 or some other resource.

In first step 302, a customer may access a graphical interface system with remote terminal 100. In some cases, the customer may access the graphical interface system through a website. Here, the term "website" is used in the most general sense as meaning any collection of data located on a remote server accessible with a web browser of some kind. In many cases, a website may be a collection of web pages found on the World Wide Web. In one embodiment, the term "web page" may refer to any HTML/XHTML document.

In some cases, vendor 102 includes a server of some type that supports a website with a graphical interface system. This graphical interface system may be used to design a customized article of footwear. In some embodiments, the graphical interface system may be a graphical editor of some kind. In one embodiment, the graphical interface system may provide a set of tools that allow the customer to easily apply a customized design to an article of footwear.

In an alternative embodiment, a website supporting a graphical interface system may be hosted outside of vendor 102. In other words, the website may be owned and run by a third party separate from the manufacturer of the customizable articles of footwear. Generally, the process of customizing an article of footwear may proceed as before. In this case, the finalized design information will be processed and sent to vendor 102 by the third party.

Although the graphical interface system may be accessed via a website through the Internet in one embodiment, in other embodiments, the graphical interface system could be accessed in other ways. For example, in some embodiments, the graphical interface system could be run directly on a remote terminal. In other words, the graphical interface system could be a program that can be installed on a remote terminal. In some cases, the graphical interface system could be installed on a personal computer of a customer. In other cases, the graphical interface system could be installed on a remote terminal located at a retail store or kiosk. In these cases, the graphical interface system may still communicate with one or more vendors through a network, such as the Internet, in order to provide customer ordering information for the customized product. Additionally, in some cases, the remote terminal could print order forms that could then be sent to one or more manufacturing facilities by a courier or a postal service.

Once the customer has accessed the graphical interface system in first step 302, the customer may select one or more graphics during second step 304. The term "graphic", as used throughout this specification and in the claims, refers to a two-dimensional or three-dimensional image that may be rendered manually, such as by drawing, or rendered automatically through technology, such as photography, printing or computer graphics.

Following the selection of input graphics, the customer may select a morphed graphic in third step 306. The term "morphed graphic", as used throughout this specification and in the claims, refers to an image created with information from a plurality of input graphics. In particular, given any two input graphics, a set of morphed graphics may be generated that includes a sequence of graphics that represent a visual transformation from one input graphic to the other. For example, in some cases, given two images that are different from one another, a morphing animation may be created that shows the transformation of one image into the other. This morphing animation will generally comprise a set of intermediate morphed graphics, each intermediate morphed graphic representing an intermediate stage in the transformation between the first graphic and the second graphic. Examples of a set of morphed graphics are given below.

In some embodiments, a morphed graphic may be created from input graphics using a software program. Algorithms for generating morphs between two or more images are known in the art. In some cases, a morphed graphic includes a combination of information from both selected images. In other cases, an algorithm for generating morphed images may create graphics with additional information that is not associated with either selected image.

Following a customer selection of the morphed graphic in third step 306, the customer may select an article of footwear in fourth step 308. During fifth step 310, the customer may scale the morphed graphic and choose a location for the scaled morphed graphic on the selected article of footwear. Following this, during sixth step 312, the customer may submit the customized design to vendor 102.

During seventh step 314, vendor 102 may receive the customized design from the customer. Following seventh step 314, vendor 102 may manufacture the article of footwear according to the customized design in eighth step 316. After manufacturing the customized article of footwear, vendor 102 may inspect the customized article of footwear and executes quality control procedures during ninth step 318. Once vendor 102 has inspected the customized article of footwear, vendor 102 may ship the customized article of footwear to a pre-designated address.

The following description discusses the details of the steps outlined and briefly described with reference to FIG. 3. In some cases, a customer has access to a remote terminal. Using the remote terminal, the customer may gain access to a website supplied by the vendor or a third party. In some embodiments, the web site may include a graphical interface system, as discussed briefly in first step 302.

The process of creating a customized article of footwear may begin with a customer selecting a plurality of graphics. In some cases, a graphical interface system may provide a pre-selected set of graphics from which a customer may select a plurality of input graphics. In some cases, the pre-selected set of graphics may include graphics created from graphics software programs, text, photographic images, and other types of images.

Figure 4:
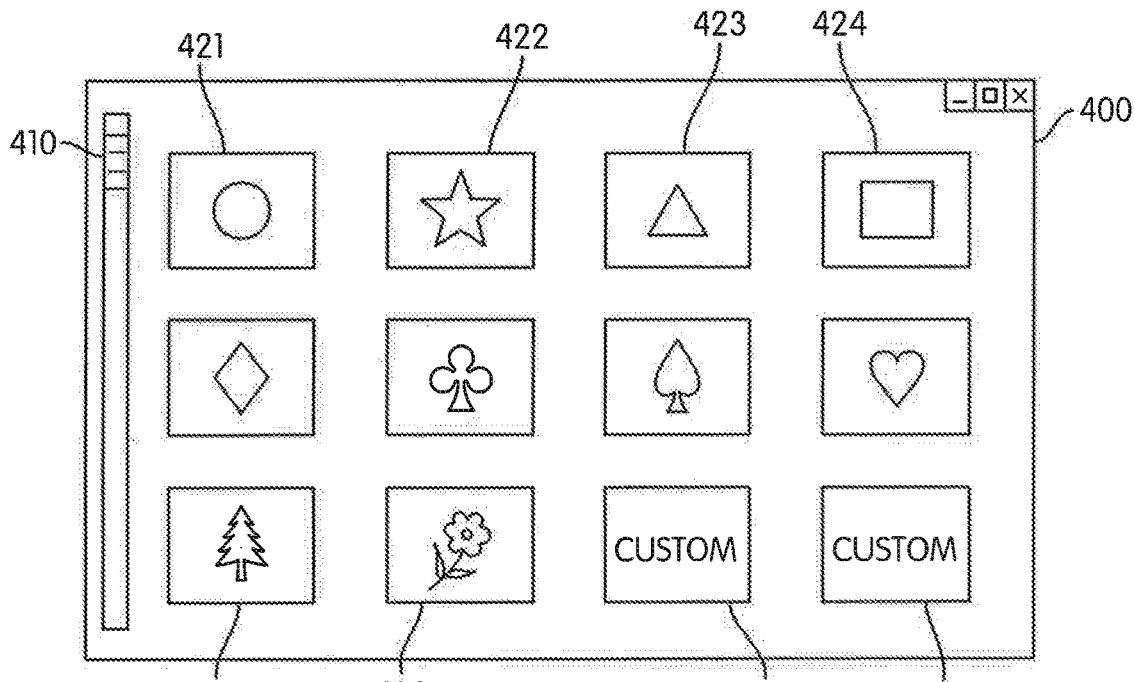
FIG. 4 is an embodiment of a graphical interface system displaying a pre-selected set of graphics.

FIG. 4 illustrates an embodiment of graphical interface system 400 displaying a pre-selected set of graphics. In this embodiment, graphical interface system 400 displays a pre-selected set of twelve graphics. In other embodiments, graphical interface system 400 may display more or less graphics. In some cases, graphical interface system 400 may provide scroll bar 410 to allow a customer to view additional graphics. In other cases, graphical interface system 400 may include other provisions to allow a customer to view additional graphics.

Generally, graphical interface system 400 may display a variety of graphic types. In this embodiment, for example, graphical interface system 400 displays graphics comprising computer generated designs, photographic images, and text. In particular, graphical interface system 400 displays first graphic 421 that is a computer generated design of a circle. Likewise, second graphic 422 is a computer generated design of a star. Furthermore, third graphic 423 and fourth graphic 424 comprise computer graphics of a triangle and rectangle, respectively. In addition, graphical interface system 400 displays ninth graphic 429 and tenth graphic 430, which are photographic images of a tree and a flower, respectively. Also, graphical interface system 400 displays spaces for eleventh graphic 431 and twelfth graphic 432 that could be custom designed graphics. With this arrangement, graphical interface system 400 may provide a customer with a selection of different types of graphics.

Although only two-dimensional graphics are illustrated in the current embodiment, in other embodiments three-dimensional graphics could also be used. For example, in some embodiments, a graphic of a sphere could be included. Other possible three-dimensional graphics include, but are not limited to, cubes, oblate spheroids, prisms, regular three-dimensional shapes, irregular three-dimensional shapes as well as any other type of three-dimensional shape.

A graphical interface system 400 may include provisions for allowing a customer to import various designs or graphics from outside sources. In some embodiments, a customer may attach various media devices to a remote terminal in order to import various graphics or designs to graphical interface system 400. In one embodiment, a customer may upload pictures or photos from a digital camera or from another source. Generally, images supplied to a graphical interface system 400 by a customer may be referred to as customer designated graphics.

Figure 5:
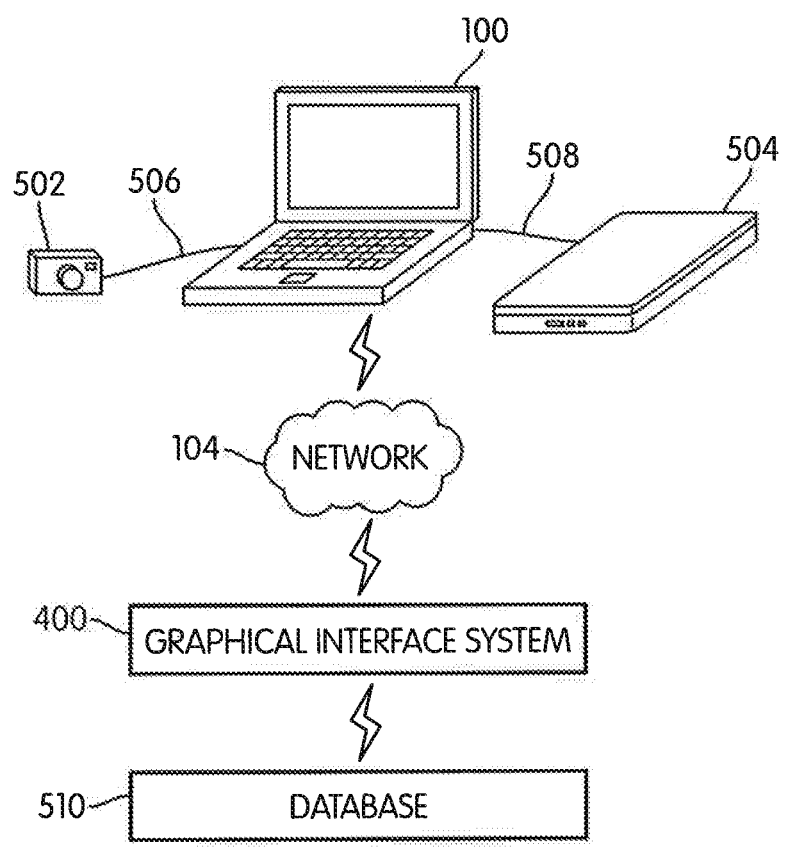
FIG. 5 is a schematic view of an illustrative embodiment of a remote terminal connected to a digital camera and a scanner.

Referring to FIG. 5, remote terminal 100 may be connected to digital camera 502 and scanner 504 through first cable 506 and second cable 508, respectively. Digital camera 502 and scanner 504 are only meant to be representative of the various types of digital media from which a customer may import photographs or other types of graphics. Generally, a photograph taken with digital camera 502 may be imported directly to remote terminal 100. Likewise, a photograph may be scanned using scanner 504 and transferred to remote terminal 100. From remote terminal 100, these graphics may be uploaded to graphical interface system 400 through network 104.

In some cases, graphical interface system 400 may be associated with database 510 of pre-selected graphics. In one embodiment, database 510 may be connected directly to graphical interface system 400. Database 510 may include any kind of storage device, including but not limited to magnetic, optical, magneto-optical, and/or other memory devices, including volatile memory and non-volatile memory devices.

Generally, graphics may be gathered from any source, including the Internet. In this case, images and graphics may be downloaded from network 104 to remote terminal 100 and subsequently transmitted to graphical interface system 400.

Graphical interface system 400 may allow a customer to select any number of graphics for creating a customized morphed graphic. In other words, a customer may select any number of graphics from the set of pre-selected graphics provided by vendor 102 or customer designated graphics. In some embodiments, graphical interface system 400 may allow the customer to select three graphics. In other embodiments, graphical interface system 400 may allow the customer to select four graphics. In one embodiment, graphical interface system 400 may allow the customer to select two graphics.

Generally, graphics may be selected in any manner. In some embodiments, graphical interface system 400 may provide a customer with a drop down menu to select the names of graphics. In other embodiments, graphical interface system 400 may include a selection tool that a customer may manipulate to select the graphics. In still other embodiments, graphical interface system 400 may include other provisions for the selection of graphics.

Figure 6:
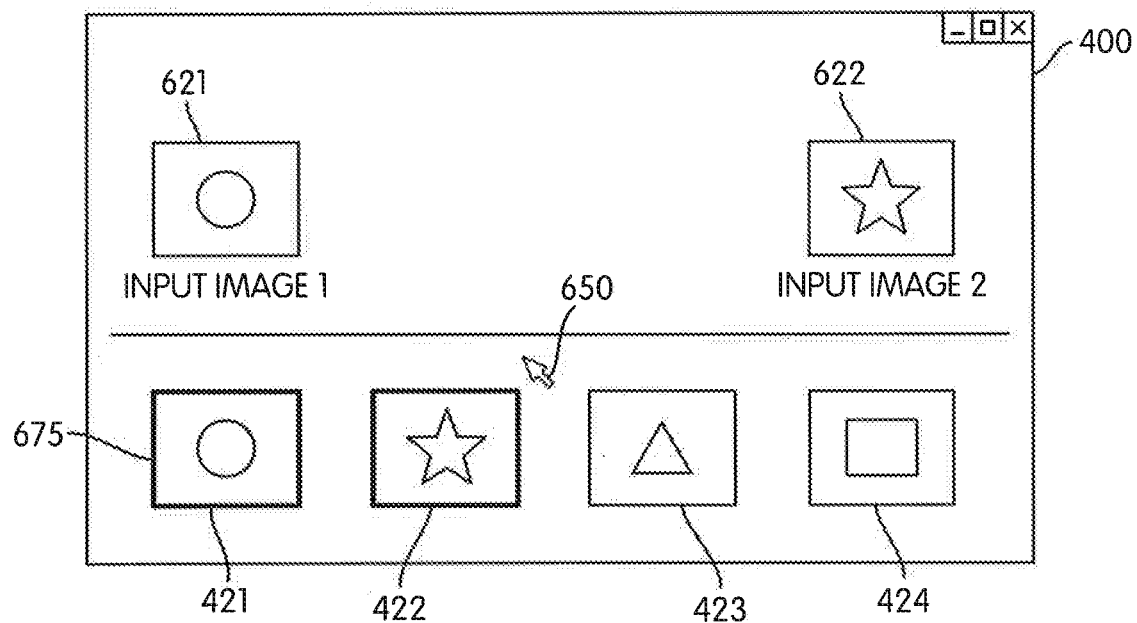
FIG. 6 is an embodiment of a graphical interface system displaying two selected graphics.

FIG. 6 is an exemplary embodiment of graphical interface system 400 following the selection of two graphics. As previously mentioned, a customer may choose any of the pre-selected graphics provided by vendor 102 or customer designated graphics. In particular, it should be understood that a customer may choose two different types of graphics. In this embodiment, a customer selects first graphic 421 as first selected graphic 621 and second graphic 422 as second selected graphic 622 with selection tool 650.

In some embodiments, graphical interface system 400 may include additional menus of graphics as well as tools to manipulate graphics. For example, in some cases, graphical interface system 400 may include a tool to magnify a graphic in order to view details of the graphic. In this embodiment, graphical interface system 400 displays graphics menu 675. In some cases, graphics menu 675 includes graphics from the pre-selected graphics and customer designated graphics. In particular, first graphic 421, second graphic 422, third graphic 423 and fourth graphic 424 are visible within graphics menu 675. In some cases, graphics menu 675 may be associated with a scroll bar in order to view additional graphics. With this arrangement, graphical interface system 400 may provide a customer with a view of first selected graphic 621 and second selected graphic 622 as well as pre-selected graphics and customer designated graphics. This may allow a customer to change first selected graphic 621 and second selected graphic 622.

Following the selection of a first selected graphic and a second selected graphic, graphical interface system 400 may be configured to allow a customer to create a morphed graphic from the first selected graphic and the second selected graphic. In some embodiments, graphical interface system 400 may provide a discrete set of morphed graphics and allow a customer to select a morphed graphic from the discrete set of morphed graphics. In other embodiments, graphical interface system 400 may provide a substantially continuous range of morphed graphics. In some cases, a customer may choose a user selected value that is associated with the continuous range of morphed graphics. Following this, graphical interface system 400 may generate a morphed graphic from the first selected graphic and the second selected graphic according to the user selected value. With this arrangement, graphical interface system 400 may be configured to allow a customer to create a customized morphed graphic from the first selected graphic and the second selected graphic.

Generally, graphical interface system 400 may be configured in various ways to allow a customer to supply a user selected value. In some embodiments, graphical interface system 400 may include provisions to receive a user selected value from a range of values. In some cases, a minimum value of the range may indicate that the morphed graphic should be created that is substantially similar to the first selected graphic. Likewise, a maximum value of the range may indicate that the morphed graphic should be created to be substantially similar to the second selected graphic. Similarly, a number in the middle of the range may convey that the morphed graphic should be created with substantially equal amounts of information from the first selected graphic and the second selected graphic. With this configuration, the position of the user selected value within the range of values may indicate the proportion of information to include in the morphed graphic from the first selected graphic and the second selected graphic. In a preferred embodiment, graphical interface system 400 may include a slider that may be manipulated by a customer to control a user selected value.

In some embodiments, a user selected value may take on discrete values. In other words, a user selected value is associated with a limited number of values. In other embodiments, a user selected value may take on continuous values. In other words, the user selected value is associated with a substantially unlimited number of values.

Figure 7:
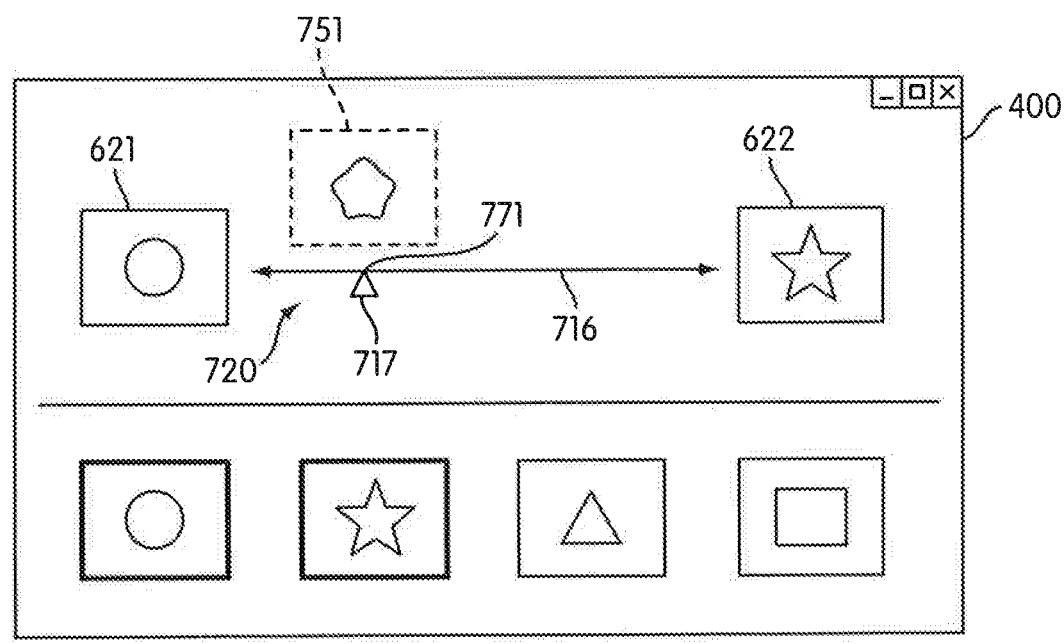
FIG. 7 is an embodiment of a graphical interface system displaying a morphed graphic that includes information from two selected graphics.

FIG. 7 is an embodiment of graphical interface system 400 following the selection of first selected graphic 621 and second selected graphic 622 in FIG. 6. As previously discussed, first selected graphic 621 has a circle shape. In addition, second selected graphic 622 is star shaped. In other embodiments, first selected graphic 621 and second selected graphic 622 may be configured with other shapes or images.

In this embodiment, graphical interface system 400 includes slider 720. Furthermore, slider 720 includes track 716 and indicator 717. In some cases, track 716 may be disposed horizontally between first selected graphic 621 and second selected graphic 622. In other cases, track 716 may be disposed in another location within graphical interface system 400. With this arrangement, indicator 717 may be manipulated on track 716 to indicate the degree of morphing between first selected graphic 621 and second selected graphic 622 to generate a morphed graphic.

In the current embodiment, a customer may move indicator 717 on track 716 to a position that may be associated with a morphed graphic. For example, a customer may move indicator 717 closer to first selected graphic 621 than second selected graphic 622 to create a morphed graphic that looks more like first selected graphic 621 than second selected graphic 622. Likewise, a customer may move indicator 717 closer to second selected graphic 622 than first selected graphic 621 to create a morphed graphic that looks more like second selected graphic 622.

In the current embodiment, indicator 717 is disposed in first position 771 on track 716. Furthermore, first position 771 is associated with first morphed graphic 751. Since indicator 717 is close to first selected graphic 621, first morphed graphic 751 may contain more information from first selected graphic 621 than second selected graphic 622. Specifically, first morphed graphic 751 includes a generally circular shape with irregular edges.

Figure 8:
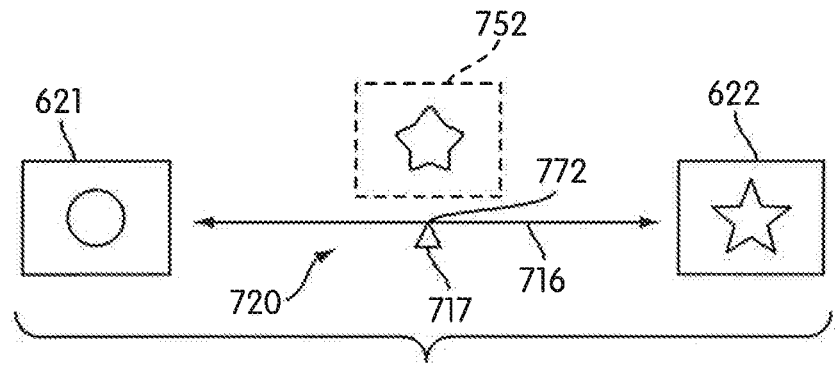
FIG. 8 is a schematic view of an exemplary embodiment of a morphed graphic associated with a position of an indicator of a graphical slider.
Figure 9:
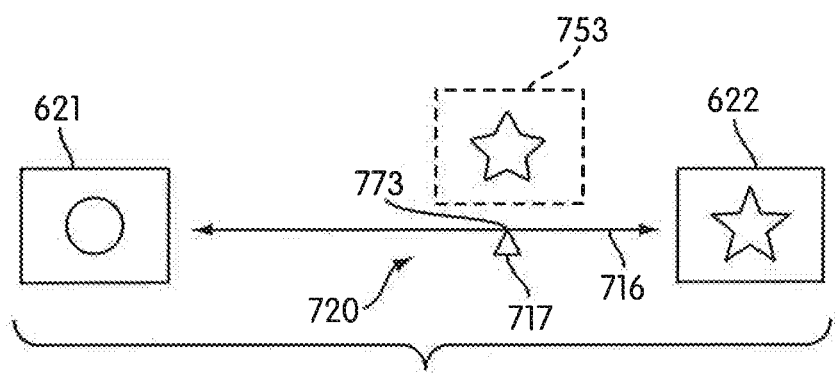
FIG. 9 is a schematic view of an exemplary embodiment of a morphed graphic associated with a position of an indicator of a graphical slider.
Figure 10:
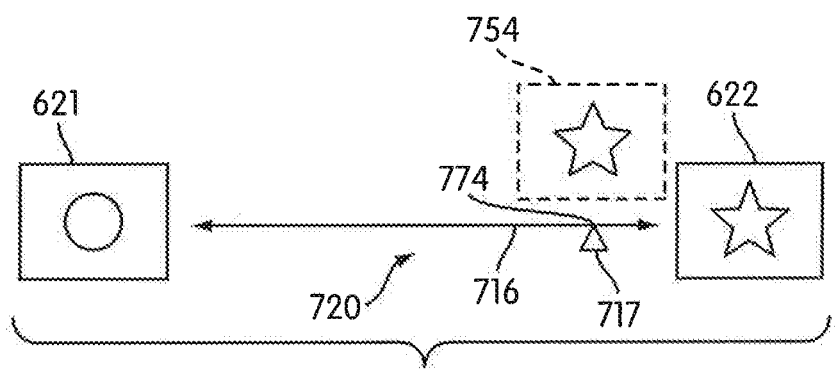
FIG. 10 is a schematic view of an exemplary embodiment of a morphed graphic associated with a position of an indicator of a graphical slider.

FIGS. 8-10 illustrate exemplary embodiments of morphed graphics that may be associated with different positions of indicator 717. The morphed graphics illustrated in these embodiments are intended to be exemplary. In addition, aspects of the morphed graphics may be different with various positions of indicator 717 although changes may not be obvious in these exemplary embodiments. In other embodiments, positions of indicator 717 may be associated with different morphed graphics.

Referring to FIG. 8, indicator 717 is disposed in second position 772. Second position 772 is approximately in the middle of slider 716. With this arrangement, second position 772 may be associated with second morphed graphic 752 that is generated with approximately equal amounts of information from first selected graphic 621 and second selected graphic 622. In other words, second morphed image 752 may be considered as an average of first selected image 621 and second selected image 622. In particular, second morphed graphic 752 may have a generally circular shape with five rounded protrusions.

In some cases, as indicator 717 is moved to a position closer to second selected graphic 622, a morphed graphic may be created that closer resembles second selected graphic 622. Referring to FIG. 9, indicator 717 is disposed in third position 773 that is closer than second position 772 to second selected graphic 622. In this embodiment, third position 773 may be associated with third morphed graphic 753. With this arrangement, third morphed graphic 753 bares a closer resemblance than second morphed graphic 752 to second selected graphic 622. Specifically, the rounded protrusions of second morphed graphic 752 have lengthened in third morphed graphic 753. In this manner, third morphed graphic 753 more closely resembled a five-pointed star than a circle. However, in this embodiment, the points of third morphed graphic 753 remain rounded.

Referring to FIG. 10, indicator 717 is in fourth position 774 that is closer than third position 773 to second selected graphic 622. With this configuration, fourth position 774 may be associated with a morphed graphic that is more similar than third morphed graphic 753 to second selected graphic 622. In this embodiment, fourth position 774 is associated with fourth morphed graphic 754. Fourth morphed graphic 754 appears as a five-pointed star with non-rounded points. However, the protrusions of fourth morphed graphic 754 are not quite as pointed as in second selected graphic 622.

In these exemplary embodiments, indicator 717 is moved to positions successively closer to second selected graphic 622. However, it should be understood that indicator 717 may be moved closer to first selected graphic 621 to create morphed graphics more closely resembling first selected graphic 621. Using this configuration, graphical interface system 400 may allow a customer to fine tune the shape of the morphed graphic.

Figure 11:
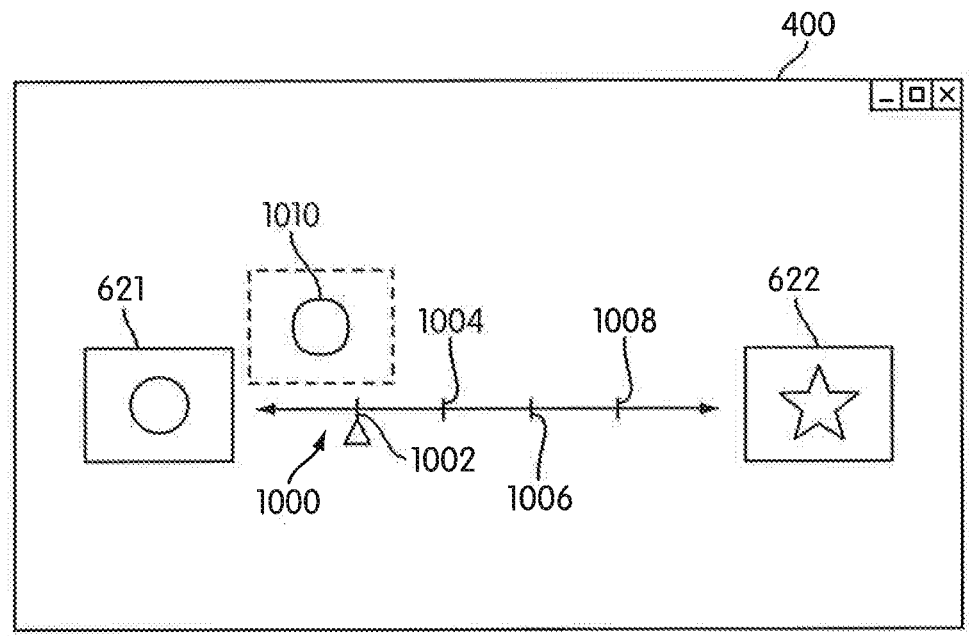
FIG. 11 is a schematic view of an embodiment of a discrete range for selecting a morphed graphic.

It is also possible that graphical interface system 400 may be configured in another manner to allow a customer to select a morphed graphic. In some embodiments, graphical interface system 400 may generate a discrete set of morphed graphics based on the input graphics. For example, FIG. 11 illustrates an embodiment including a discrete set of indicator positions 1000, including first indicator position 1002, second indicator position 1004, third indicator position 1006 and fourth indicator position 1008. In this case, each indicator position corresponds to a particular morphed graphic. For example, first indicator position 1002 corresponds with first morphed graphic 1010. Thus, rather than selecting from a continuous range of possible customized graphics, some embodiments may restrict a user to selecting from a discrete set of possible morphed graphics that lie in a range between first selected graphic 621 and second selected graphic 622. With this arrangement, a customer may choose a morphed graphic from a discrete set of morphed graphics.

Figure 12:
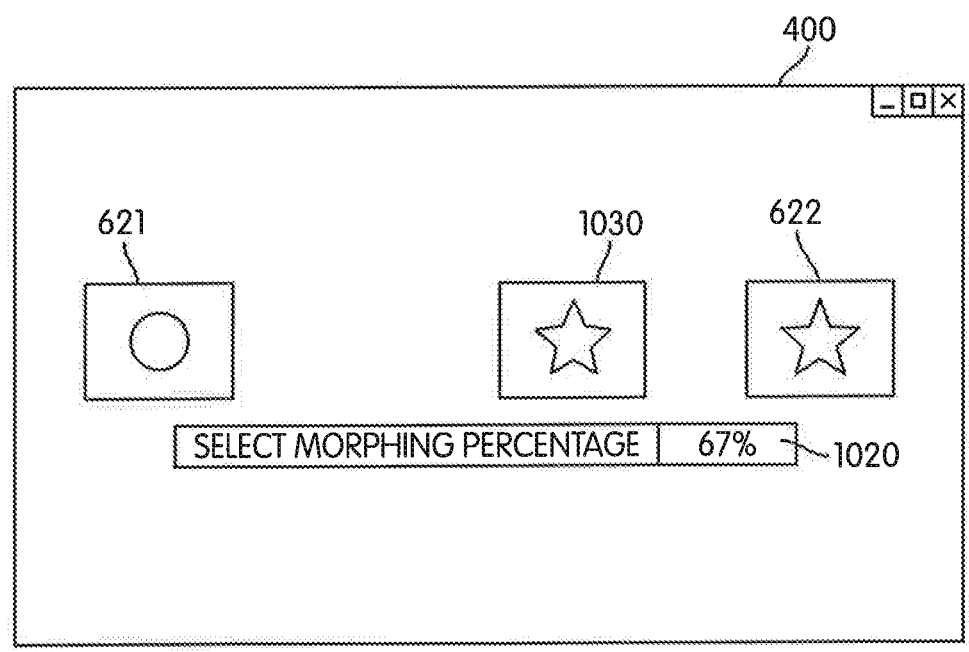
FIG. 12 is a schematic view of an embodiment of a selection tool for a morphed graphic.

FIG. 12 illustrates still another embodiment of a method of selecting a morphed graphic. In this case, graphical interface system 400 can provide a user input region 1020. User input region 1020 may allow a user to enter a numerical value that is associated with a particular morphed graphic. In some cases, input region 1020 may prompt a user to enter a morphing percentage. For example, in one embodiment, a user may enter 67% as the desired morphing percentage. The user is then prompted with morphed graphic 1030, which is a graphic that is 67% of the way between graphic 621 and graphic 622. This arrangement allows a user to select any numerical percentage to generate a new morphed graphic.

Figure 13:
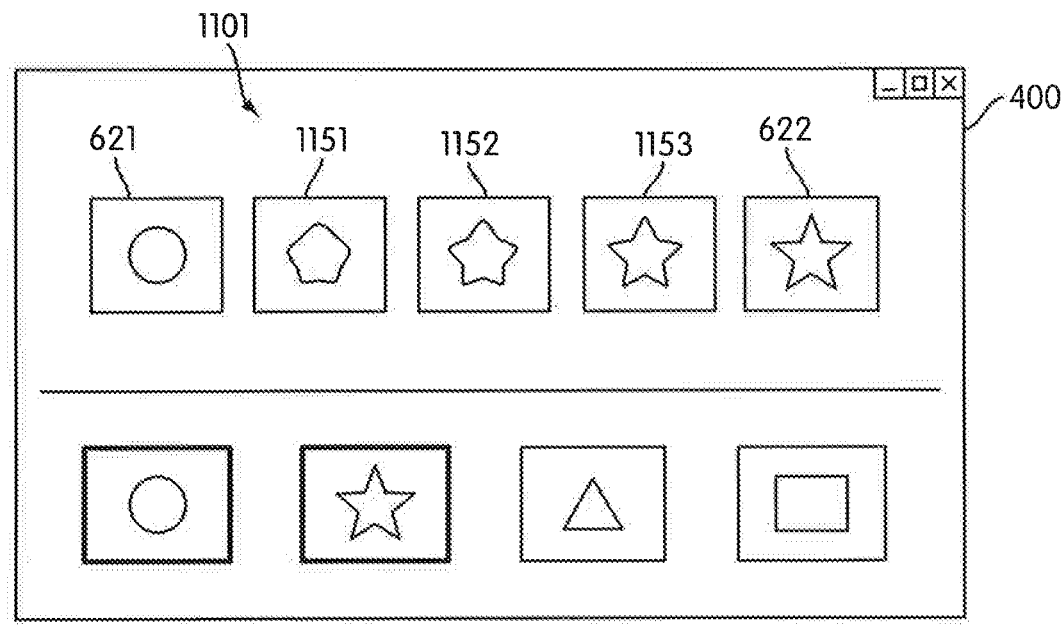
FIG. 13 is an alternative embodiment of a graphical interface system displaying a discrete set of morphed graphics.

FIG. 13 illustrates an alternative embodiment of graphical interface system 400 following the selection of input graphics. In particular, following the selection of first selected graphic 621 and second selected graphic 622, graphical interface system 400 displays a discrete set of morphed graphics. In this embodiment, graphical interface system 400 displays first discrete set of morphed graphics 1101 based on first selected graphic 621 and second selected graphic 622.

Generally, first discrete set of morphed graphics 1101 may include any number of morphed graphics. In some embodiments, first discrete set of morphed graphics 1101 may include two morphed graphics. In other embodiments, first discrete set of morphed graphics 1101 may include three morphed graphics. In still other embodiments, first discrete set of morphed graphics 1101 may include more than three morphed graphics.

In this embodiment, first discrete set of morphed graphics 1101 includes three morphed graphics. In particular, first discrete set of morphed graphics 1101 comprises first morphed graphic 1151, second morphed graphic 1152 and third morphed graphic 1153. This arrangement provides a customer with an opportunity to select from first discrete set of morphed graphics 1101 containing three different morphed graphics.

Graphical interface system 400 may display first discrete set of morphed graphics 1101 in any manner that may aid a customer in selecting a morphed graphic. In some embodiments, first discrete set of morphed graphics 1101 may be displayed by graphical interface system 400 so that morphed graphics proximate to each other may be more similar and share more information than morphed graphics not disposed proximately. In this manner, first discrete set of morphed graphics 1101 may be displayed as a sequence of morphed graphics. In some cases, this arrangement of first discrete set of morphed graphics 1101 may assist a customer in selecting a morphed graphic.

In some cases, first selected graphic 621 and second selected graphic 622 may be disposed on opposite sides of first discrete set of morphed graphics 1101. With first discrete set of morphed graphics 1101 displayed as a sequence of morphed graphics, first morphed graphic 1151, second morphed graphic 1152 and third morphed graphic 1153 may be displayed between first selected graphic 621 and second selected graphic 622. Specifically, first morphed graphic 1151 may be displayed proximate to first selected graphic 621 to indicate that first morphed graphic 1151 is similar to first selected graphic 621. In a similar manner, third morphed graphic 1153 may be displayed proximate to second selected graphic 622 to convey that third morphed graphic 1153 is similar to second selected graphic 622. Finally, second morphed graphic 1152 may be arranged between first morphed graphic 1151 and third morphed graphic 1153 to show that second morphed graphic 1152 contains a substantially equal proportion of information from first selected graphic 621 and second selected graphic 622. In some cases, this arrangement assists a customer in selecting a morphed graphic.

As described above, the customization process may include presenting a user with a set of morphed graphics from which the user may select a desired graphic. For example, as shown in FIG. 13, a user is presented with three possible morphed graphics from which the user can select a desired morphed graphic. In general, the number of morphed graphics presented to a user could vary in different embodiments.

Some embodiments can include provisions for controlling the number of morphed graphics presented to a user during the customization process. For example, some embodiments may be configured so that the number of morphed graphics presented to a user is always equal to or greater than a predetermined minimum number. In some cases, the minimum number could be 1. In still other cases, the minimum number could be 2. In still other cases, the minimum number could be 3. In still other cases, the minimum number could be 4 or greater than 4. This arrangement may enhance the user experience by ensuring that the user is given enough options for choosing a customized morphed graphic.

Some embodiments could include a maximum number of morphed graphics that can be presented to, or otherwise provided for, a user. In other words, some embodiments may be configured so that the number of morphed graphics that may be presented to a user is always less than or equal to the maximum number. In some cases, the maximum number could be 1. In other cases, the maximum number could be 2. In still other cases, the maximum number could be any number greater than 2. In still other cases, the maximum number could be 6. In still other cases, the maximum number could be 8. In still other cases, the maximum number could be 10. In still other cases, the maximum number could be 12. This arrangement may enhance the user experience by ensuring the user is not overwhelmed with too many options when selecting a customized morphed graphic.

It is also to be understood that some embodiments could control the number of options to be displayed to a user for any other feature where the user may be presented with multiple options. In particular, this method for controlling or constraining the number of options displayed for a user is not limited to use with customized morphed graphics. For example, some embodiments may allow a user to customize other features or components of an article, beyond the application of a customized morphed graphic. Such features or components may include, but are not limited to: customizable trim elements, customizable graphical designs, customizable component colors, customizable component materials as well as any other customizable features or components associated with an article. Therefore, whenever a user is presented with a number of options for selecting a customizable component or characteristic, the number of options displayed to the user could be constrained with a minimum value and/or maximum value. Moreover, the minimum value and/or the maximum value could vary according to the feature being customized.

Figure 14:
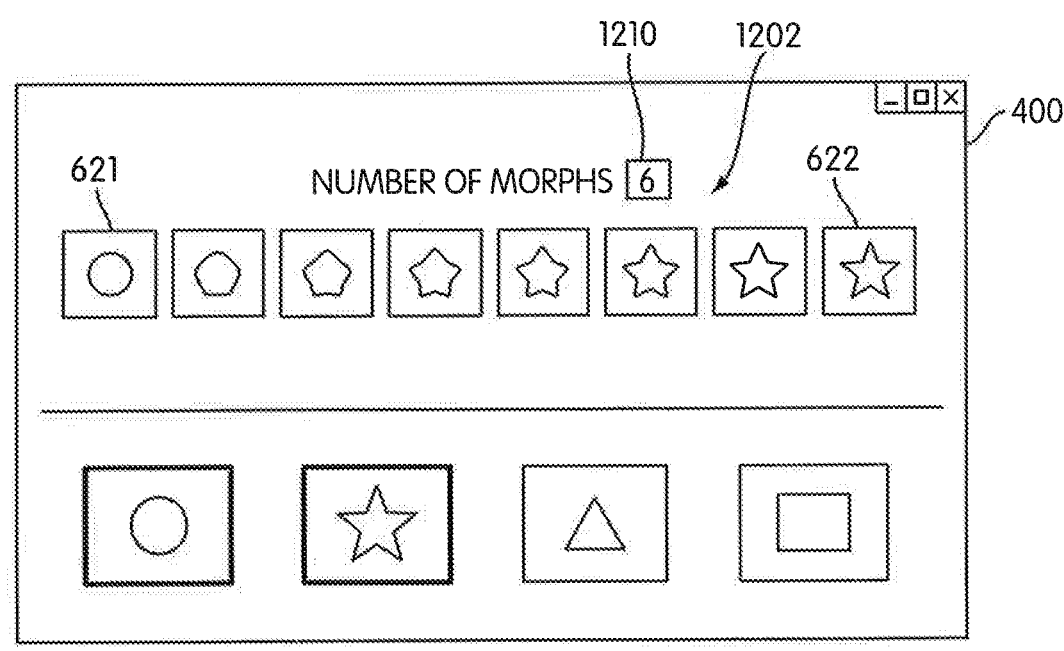
FIG. 14 is an alternative embodiment of a graphical interface system displaying a discrete set of morphed graphic where the number of morphed graphics within the discrete set is selected by a customer.

In some cases, graphical interface system 400 may allow a customer to select a number of morphed graphics that may be displayed in a set of discrete morphed graphics. FIG. 14 is an alternative embodiment of graphical interface system 400 following the selection of first selected graphic 621 and second selected graphic 622. In this alternative embodiment, graphical interface system 400 prompts a customer to select a number of morphed graphics to display. This may be accomplished in any manner known in the art. In some cases, this may be accomplished through a drop-down menu. In this embodiment, graphical interface system 400 prompts a customer to enter a number of morphs in text box 1210.

In this exemplary embodiment, a customer requests that graphical interface system 400 display six morphed graphics. With this request, graphical interface system 400 generates second discrete set of morphed graphics 1202. Second discrete set of morphed graphics 1202 may include six morphed graphics. This provides a customer with an opportunity to select a morphed graphic from six different morphed graphics in second set of morphed graphics 1202.

Similar to the previous embodiment, second discrete set of morphed graphics 1202 may be displayed by placing morphed graphics containing a higher proportion of information from first selected graphic 621 closer to first selected graphic 621. Likewise, morphed graphics containing a higher proportion of information from second selected graphic 622 may be disposed closer to second selected graphic 622. With this arrangement, second discrete set of morphed graphics 1202 may be displayed in an ordered manner allowing a customer a clear choice in morphed graphics.

Following the selection of a morphed graphic, a customer may create a customized article of footwear. In some embodiments, a customer may continue the customization process and customize an article of footwear with a second customization system. In other embodiments, a customer may continue the customization process by selecting an article of footwear to associate with the morphed graphic in graphical interface system 400.

Figure 15:
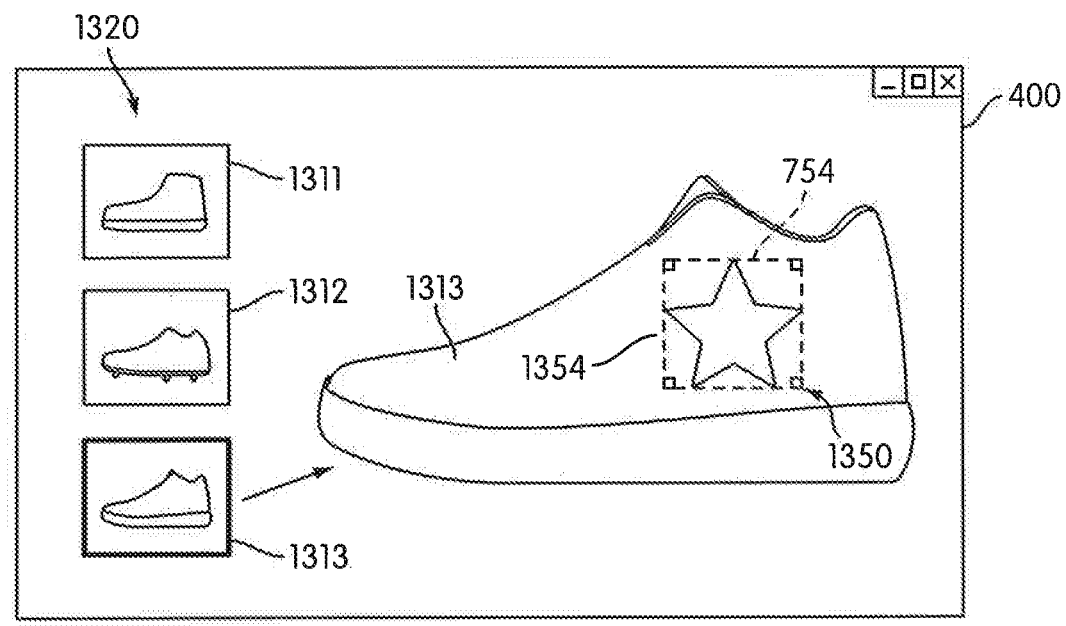
FIG. 15 is an embodiment of a graphical interface system displaying a set of articles of footwear that may be associated with a selected morphed graphic.
Figure 16:
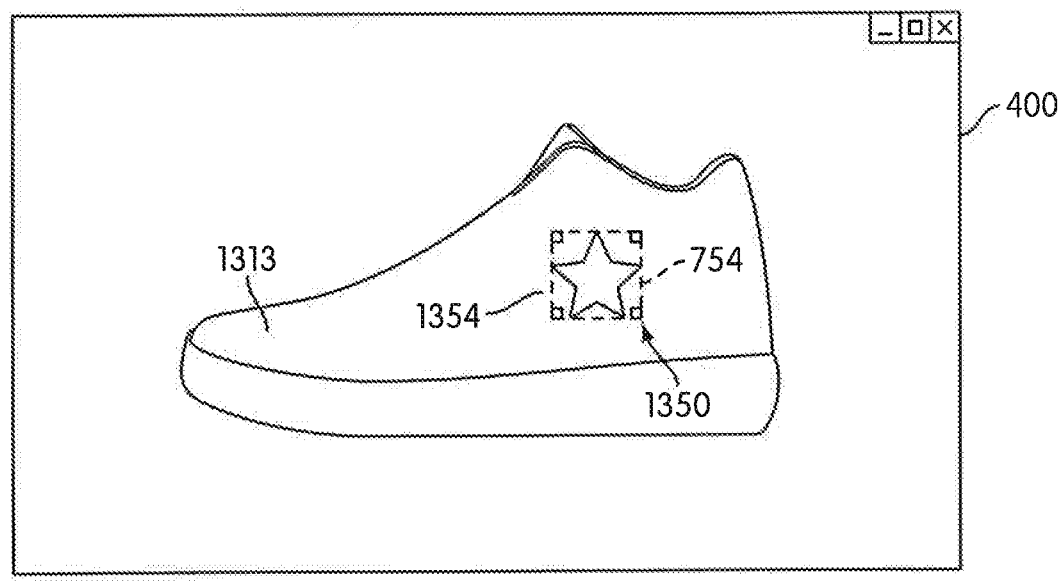
FIG. 16 is an embodiment of a graphical interface system with provisions to allow a customer to position a morphed graphic on a selected article of footwear.

FIGS. 15-16 illustrate an embodiment of graphical interface system 400 following the selection of fourth morphed graphic 754 as shown in FIG. 10. Referring to FIG. 15, graphical interface system 400 may include footwear representation menu 1320. Footwear representation menu 1320 may include a plurality of footwear representations. The term "footwear representation", as used throughout this specification and in the claims, refers to a two-dimensional embodiment of an article of footwear within graphical interface system 400. Specifically, the term "footwear representation" may include the structural design of the represented article of footwear. Additionally, the term "footwear representation" may include any other design attributes including, but not limited to, patterns, shapes, designs, colors, images, and any other graphical feature of the outer surface of the represented article of footwear.

In this embodiment, footwear representation menu 1320 includes three footwear representations. In other embodiments, footwear representation menu 1320 may include more or less footwear representations. In some cases, footwear representation menu 1320 may be associated with a scroll bar or other means of allowing a customer to view additional footwear representations.

In this exemplary embodiment, footwear representation menu 1320 displays first footwear representation 1311, second footwear representation 1312 and third footwear representation 1313. For the purposes of illustration, first footwear representation 1311 is depicted here in the form of a boot. Similarly, second footwear representation 1312 is displayed as an athletic shoe with cleats. Finally, third footwear representation 1313 is displayed in the form of a running shoe. However, in other embodiments, footwear representation menu 1320 may include any other type of footwear including, but not limited to, a boot, a basketball shoe, a running shoe, a dance shoe, as well as other kinds of footwear.

Additionally, throughout this specification, it should be understood that not only a single article of footwear, but a pair of footwear may be designed with a customization system. Any morphed graphics applied to the design of one article of footwear may likewise be applied to a second, complementary, article of footwear. The term "complementary", as used throughout this specification and in the claims, refers to the association of a left article of footwear with a right article of footwear and vice-versa. Also, it should be understood that each article of footwear of a pair may be designed independently. In other words, the complementary articles of footwear need not include identical morphed graphics.

In some embodiments, an enlarged view of a footwear representation may be generated by graphical interface system 400 when a customer selects a footwear representation from footwear representation menu 1320. In this embodiment, a customer selects third footwear representation 1313. With this selection, graphical interface system 400 displays an enlarged view of third footwear representation 1313.

In some embodiments, graphical interface system 400 may include provisions for modifying the view of a selected footwear representation in order to allow a customer to view different regions of the footwear representation. In some cases, this may include a provision for rotating a footwear representation about a set of axes. In other cases, graphical interface system 400 may allow a customer to translate a selected footwear representation vertically or horizontally. In still other cases, graphical interface system 400 may provide provisions for magnifying a portion of a footwear representation in order to allow a customer to view details of the footwear representation. For purposes of clarity, these additional provisions are not included in this embodiment of graphical interface system 400.

Following the selection of a footwear representation, a graphical interface system may include provisions to allow a customer to position a morphed graphic on the footwear representation. In this embodiment, graphical interface system 400 includes directional tool 1350. In other embodiments, graphical interface system 400 may be configured with other provisions to allow a customer to position fourth morphed graphic 754 on third footwear representation 1313.

With directional tool 1350, a customer positions fourth morphed graphic 754 on customer selected portion 1354 of third footwear representation 1313. In this embodiment, customer selected portion 1354 is disposed on a lateral portion of an upper. In other embodiments, customer selected portion 1354 may be any portion of third footwear representation 1313 that may be manufactured with fourth morphed graphic 754.

In some cases, graphical interface system 400 is configured to allow a customer to scale a selected morphed graphic when positioning the morphed graphic on a chosen footwear representation. Generally, a selected morphed graphic may be scaled in a horizontal and/or vertical direction to enlarge or contract the selected morphed graphic. In some cases, a user may have control over the width, length and/or height of a graphic. With this scaling ability, the customer can modify the size of a graphic to accommodate different sized articles or to achieve a desired look for an article.

Although a customized morphed graphic is scaled by a customer in the current embodiment, in other embodiments the customized morphed graphic may be scaled automatically by a vendor. In some cases, the graphical interface system could be associated with software for scaling a graphic to fit a particular shoe size. Furthermore, the customized morphed graphic could be automatically aligned on a portion of the article to prevent any overlap with trim or other features of the particular footwear design.

Referring to FIG. 16, a customer uses directional tool 1350 to contract fourth morphed graphic 754 in a vertical and horizontal direction. With this arrangement, fourth morphed graphic 754 is compressed and positioned on customer selected portion 1354 of third footwear representation 1313. With this arrangement, a customer may complete the customized design of an article of footwear and submit the customized design to a vendor.

In some embodiments, once a customer has selected a customized design including a morphed graphic, the customer may continue customizing the article using graphical interface system 400. In some cases, the customer could customize colors, add designs or otherwise further customize the customized article type. In some cases, graphical interface system 400 can include additional tools for adding additional customized designs. A method for modifying articles in this manner is disclosed by David P. Jones et al. in U.S. Pat. No. 7,945,343, issued May 17, 2011, originally U.S. patent application Ser. No. 11/612,320, filed Dec. 18, 2006 and entitled "Method of Making an Article of Footwear", the entirety of which is hereby incorporated by reference.

Figure 17:
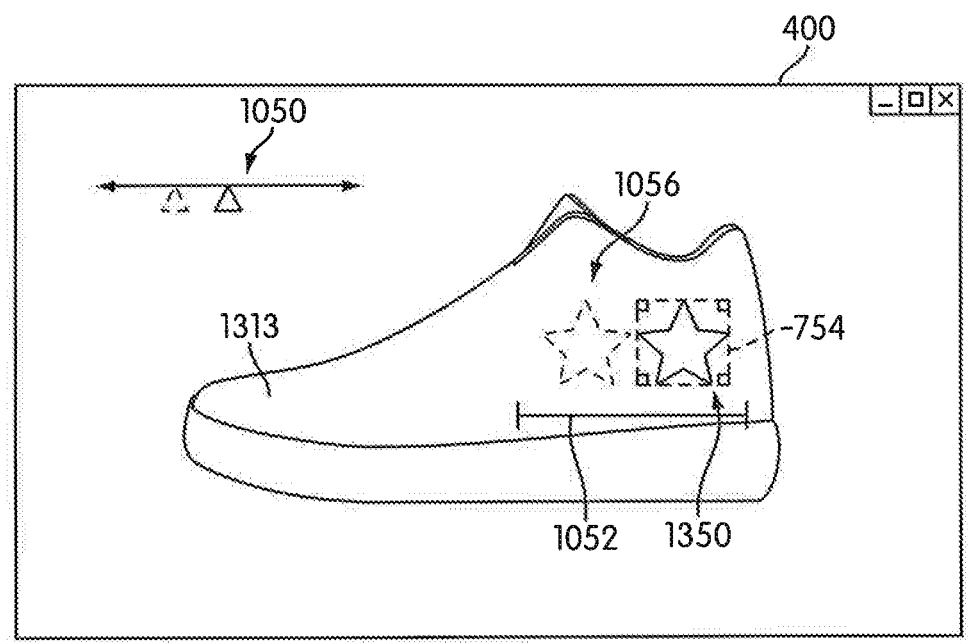
FIG. 17 is a schematic view of an embodiment of a graphic being repositioned on a footwear representation.

A customization system can include provisions for allowing a user to modify the position of a graphic or other design element within a predetermined region. For example, FIG. 17 illustrates an embodiment where a user may modify the position of customized graphic 754. In some cases, a user may utilize positioning slider 1050 to move customized graphic 754 to various horizontal positions of third footwear representation 1313. In some cases, the system may be configured so that a user can only move customized graphic 754 within a predetermined horizontal range 1052, which corresponds with the range of positioning slider 1050. This arrangement may help to ensure that customized graphic 754 stays within a predetermined region 1056. Restricting graphics to predetermined regions may help reduce interference between a customized graphic and other components of an article, as well as ensure that graphics are placed in regions that are favorable to printing or other methods of applying graphics to an article.

Figure 18:
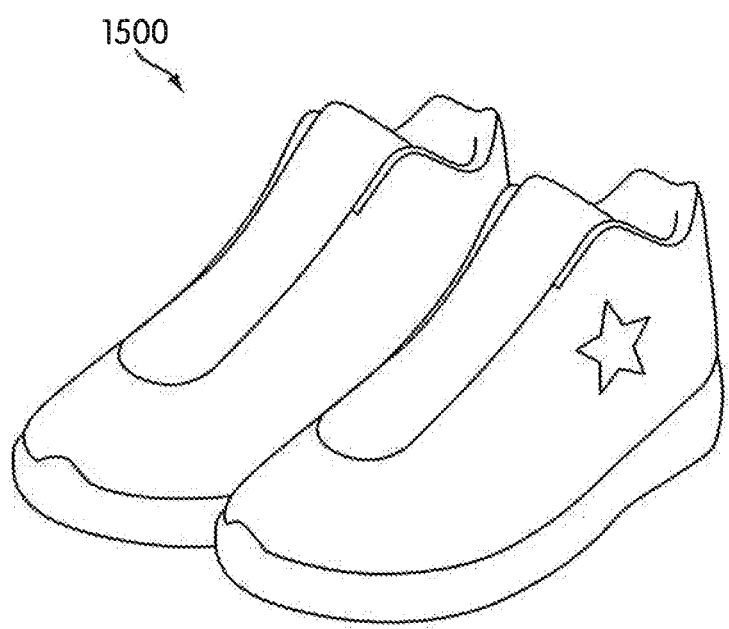
FIG. 18 is an exemplary embodiment of a pair of footwear manufactured according to a customized design selected by a customer.

After a vendor receives a customized design from a customer, the vendor may manufacture a pair of footwear with the customized design. FIG. 18 illustrates an exemplary embodiment of manufactured pair of footwear 1500. Once pair of footwear 1500 has been manufactured, it may be inspected for quality by the vendor. During this inspection pair of footwear 1500 may be compared to third footwear representation 1313 and scaled fourth morphed graphic 754 disposed on customer selected portion 1354 as seen in FIG. 16. Therefore, pair of footwear 1500 is not only inspected for structural integrity, but also for design accuracy. Finally, once pair of footwear 1500 has passed inspection, pair of footwear 1500 may be shipped to a pre-designated address.

A customization system can include provisions for varying different graphical properties of a graphic or design element. Examples of graphical properties include, but are not limited to: optical properties (such as transparency), three dimensional properties (such as relief, texture, etc.), color properties (such as intensity, sublimation, etc.) as well as any other graphical properties. Moreover, in some cases, a user may be able to choose the method of forming a graphic. For example, in cases where a graphic may be printed onto an article, a user could select between a "normal printing" mode and a "puff printing" mode.

Figure 19:
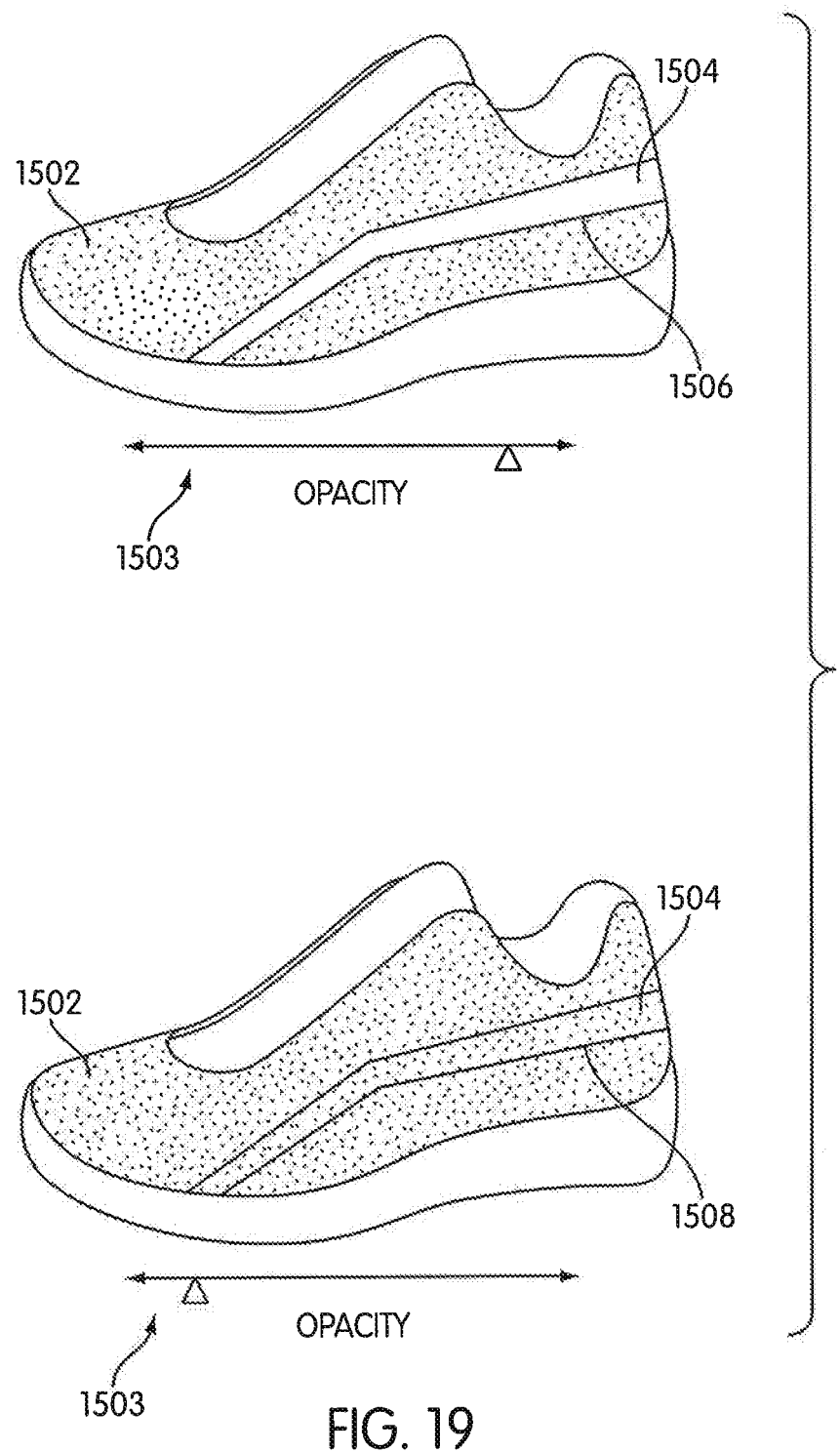
FIG. 19 is a schematic view of an embodiment in which a user can adjust the opacity of a graphic or design element.
Figure 20:
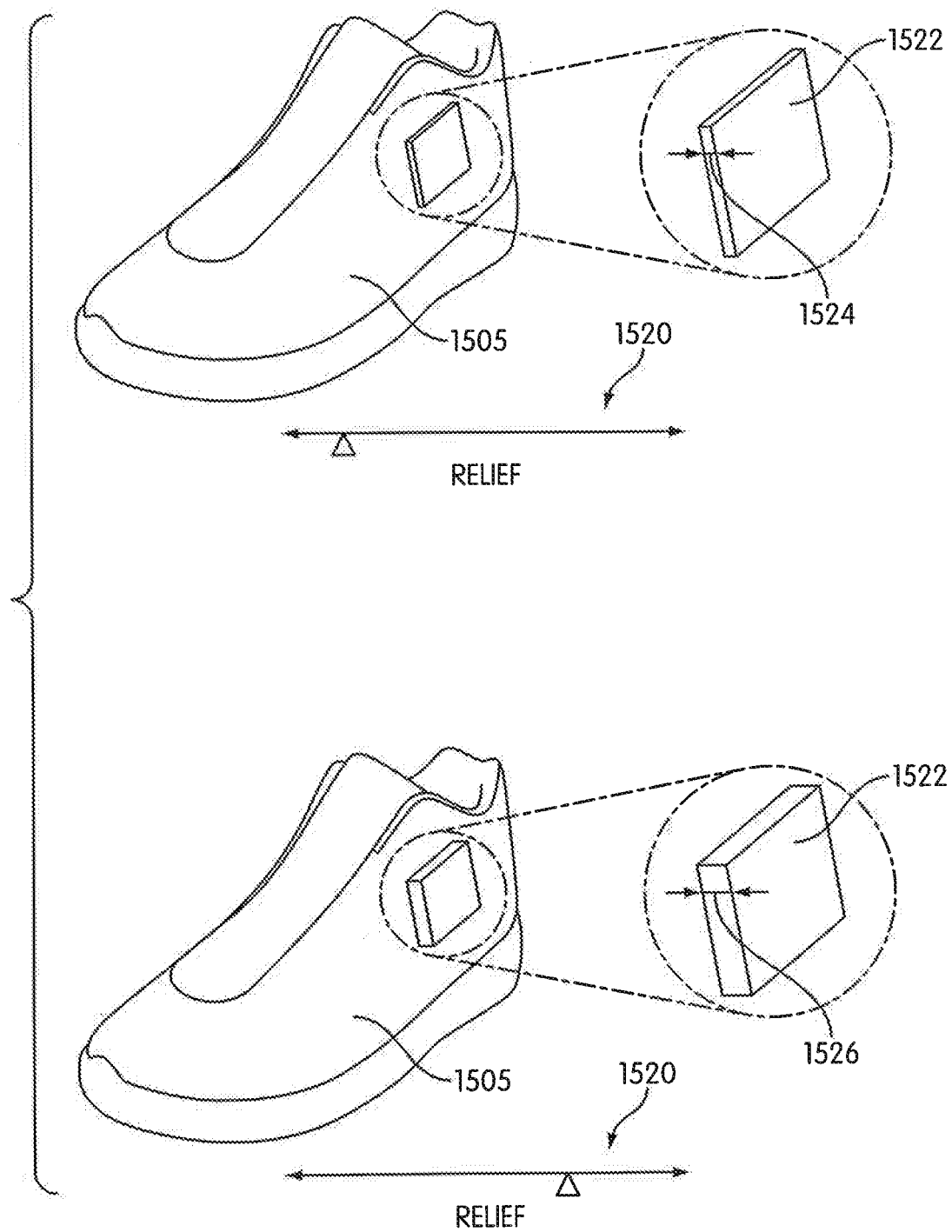
FIG. 20 is a schematic view of an embodiment in which a user can adjust the relief of a graphic or design element.

FIGS. 19 and 20 illustrate schematic views of embodiments of methods of modifying the graphical properties of graphic elements of footwear representation 1502 and footwear representation 1505, respectively. Referring to FIG. 19, a user can control the opacity of an element using opacity slider 1503. For example, in this case, the opacity of graphic 1504 is changed between a first opacity 1506 and a second opacity 1508. In this case, first opacity 1506 is generally higher than second opacity 1508, so that graphic 1504 may be varied between a generally opaque state and a generally transparent state. Referring now to FIG. 20, a user can control the relief of an element using relief slider 1520. For example, in this case, the relief of graphic 1522 is changed between a first thickness 1524 and a second thickness 1526. In this case, first thickness 1524 is generally greater than second thickness 1526, so that graphic 1522 may be varied between an approximately two dimensional graphic and a three dimensional graphic with greater relief.

In some cases, a customer may create a customized design with an intention that articles of footwear manufactured from that customized design are relatively unique. Furthermore, the unique nature of an article of footwear manufactured from a customized design may be a desirable feature of the process of creating a customized design. In other words, a customer may engage in the process of creating a customized design with a purpose to create an exclusive article of footwear.

Generally, a customized design may be exclusive if articles of footwear manufactured from the customized design are not relatively common. In some embodiments, a customization system may include a limit on the number of articles of footwear that may be manufactured from a customized graphic. This may provide exclusivity for a customized design.

Figures 21, 22:
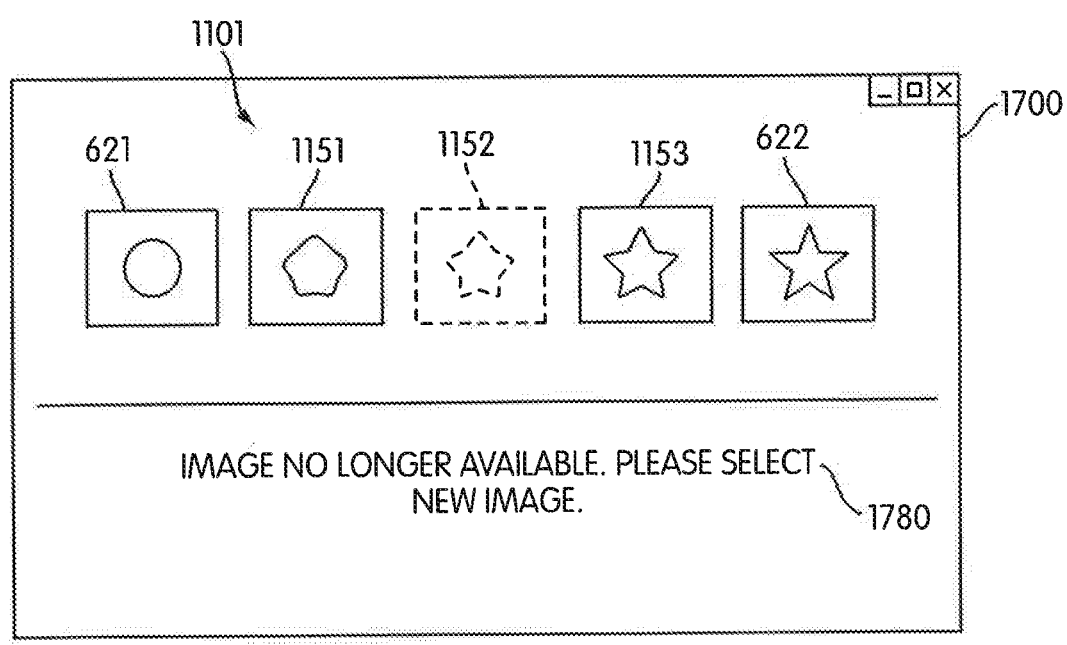
FIG. 21 is an exemplary embodiment of a portion of a database with information related to morphed graphics.
FIG. 22 is an exemplary embodiment of a graphical interface system displaying a morphed graphic that is no longer available due to exceeding a manufacture limit.

FIG. 21 illustrates an exemplary embodiment of a portion of database 1600 that may be internal to a vendor of a customization system. In this embodiment, database 1600 includes entries for customized graphics 1601, number of articles used 1602 and customized graphic limit 1603. In some embodiments, database 1600 may include additional and/or different attributes. For example, in some cases, database 1600 may include entries for type of article of footwear associated with a customized graphic or portion of article of footwear configured with a customized graphic.

In some cases, customized graphics 1601 may include an entry for each customized graphic selected by a customer. Furthermore, number of articles used 1602 may include an entry for the number of times a customized graphic is selected by a customer for a customized article of footwear. Finally, customized graphic limit 1603 may include a limit for the number of times a customized graphic may be selected by a customer. In some cases, the same limit may be applied to all customized graphics. In other cases, different limits may be entered in customized graphic limit 1603 for different customized graphics. By configuring different limits for different customized graphics, the exclusivity of customized graphics may be adjusted.

In this exemplary embodiment, database 1600 includes four entries. In particular, database 1600 indicates first customized graphic 1611 has been used 140 times and has a limit of 200. Similarly, database 1600 includes second customized graphic 1612 with number of articles used 1602 entered as 150 and customized graphic limit 1603 listed as 300. Likewise, customized graphic 1601 includes third customized graphic 1613 with number of articles used 1602 indicating 3 uses and customized graphic limit 1603 entered as 5. Finally, fourth customized graphic 1614 is displayed with number of articles used 1602 as 75 and customized graphic limit 1603 as 150. These entries are intended to be exemplary and in other embodiments the entries for graphic 1601, times used 1602 and customized graphic limit 1603 may be quite different.

In some cases, database 1600 may be associated with a graphical interface system in order to enforce the exclusivity of customized graphics. For example, a graphical interface system associated with a database 1600 may allow two more selections of third customized graphic 1613 in order to limit the selection of third customized graphic 1613 to five selections. With this configuration, database 1600 may support the exclusivity of customized graphics.

Generally, a customization system may enforce the exclusivity of customized graphics in any manner. In some embodiments, a graphical interface system may not display a customized graphic that has reached a limit designed to ensure exclusivity. In other embodiments, a graphical interface system may not permit the selection of a customized graphic that has reached a customized graphic limit.

FIG. 22 is an exemplary embodiment of graphical interface system 1700. Generally, graphical interface system 1700 may be substantially similar to the alternative embodiment of graphical interface system 400 in FIG. 13. In particular, graphical interface system 1700 may display first discrete set of morphed graphics 1101 following the selection of first selected graphic 621 and second selected graphic 622. As previously discussed in associated with FIG. 13, first discrete set of morphed graphics 1101 includes first morphed graphic 1151, second morphed graphic 1152 and third morphed graphic 1153.

In this exemplary embodiment, however, graphical interface system 1700 includes provisions to enforce exclusivity of customized designs. In this case, graphical interface system 1700 displays second morphed graphic 1152 in phantom. In some cases, graphical interface system 1700 displays second morphed graphic 1152 in phantom because a limit associated with second morphed graphic 1152 has been reached. Furthermore, text 1780 displayed by graphical interface system 1700 indicates to a customer that second morphed graphic 1152 is no longer available. Using this configuration, the exclusivity of second morphed graphic 1152 may be ensured.

Figure 23:
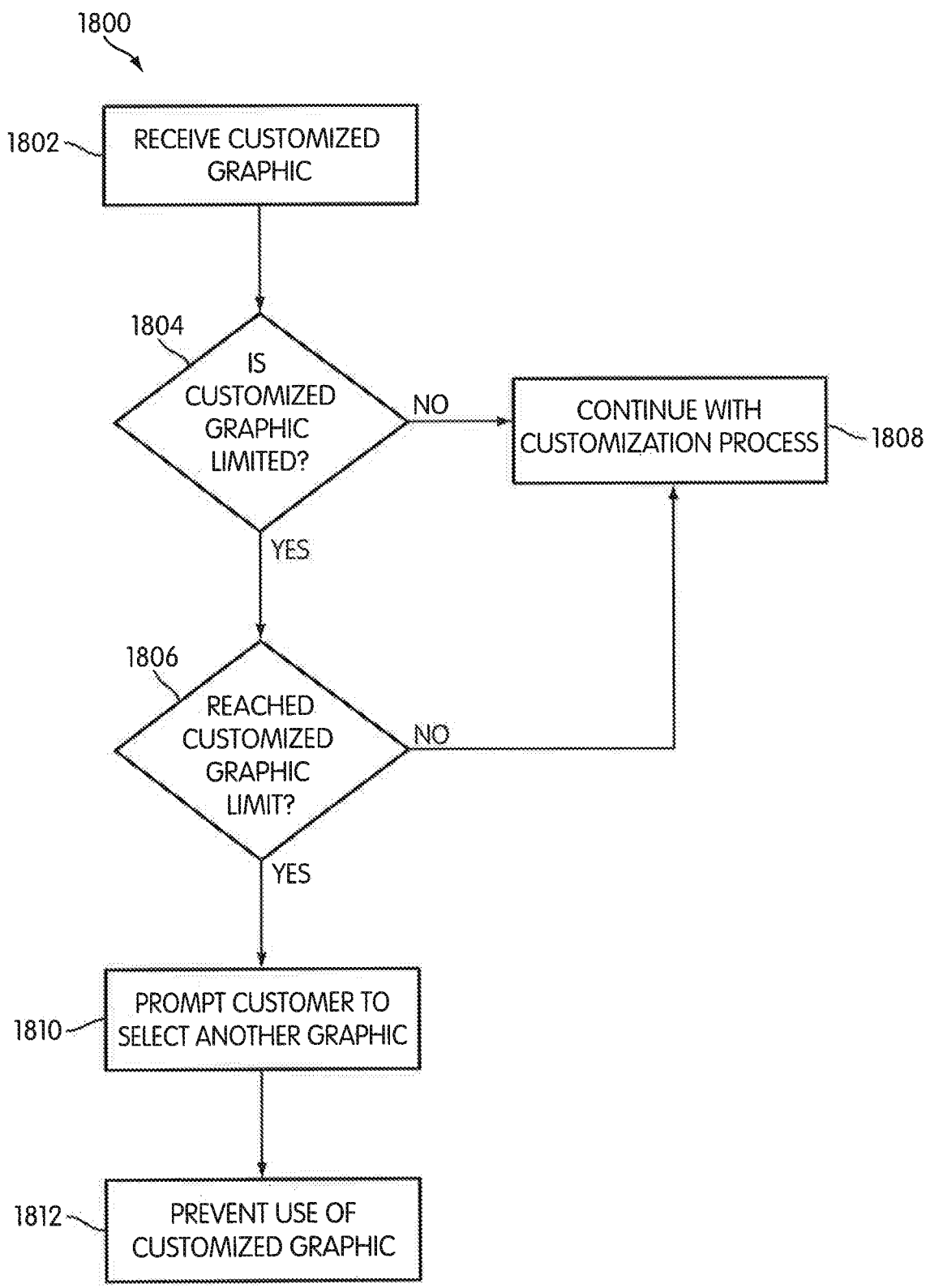
FIG. 23 is an embodiment of a process for ensuring exclusivity of morphed graphics.

FIG. 23 is an embodiment of process 1800 that may be executed to preserve exclusivity of customized graphics. During first step 1802, graphical interface system 1700 receives a customized graphic request. After receiving a customized graphic request in first step 1802, graphical interface system 1700 determines if the customized graphic is associated with a customized graphic limit during second step 1804. If the customized graphic is not associated with a customized graphic limit, graphical interface system 1700 may continues to fourth step 1808. During fourth step 1808, graphical interface system 1700 continues the customization process.

However, if graphical interface system 1700 determines that the customized graphic is associated with a customized graphic limit during second step 1804, graphical interface system 1700 proceeds to third step 1806. During third step 1806, graphical interface system 1700 checks if the customized graphic has reached the customized graphic limit. In some cases, graphical interface system 1700 may query a database such as database 1600 to determine the customized graphic limit for the requested customized graphic. If the requested customized graphic has not reached the customized graphic limit, graphical interface system 1700 proceeds to fourth step 1808 and may continue the customization process.

If graphical interface system 1700 determines in third step 1806 that the customized graphic has reached the customized graphic limit, graphical interface system 1700 prompts the customer to select another customized graphic in fifth step 1810. Following fifth step 1810, graphical interface system 1700 prevents the use of the customized graphic. With this process, the exclusivity of the customized graphic may be ensured.

Some embodiments may include provisions that allow a user to provide or prevent sharing of a customized design. For example, in situations where a user creates a novel customized graphic, a system may provide the user with an option to allow or prevent future users from selecting a substantially identical customized graphic.

Figure 24:
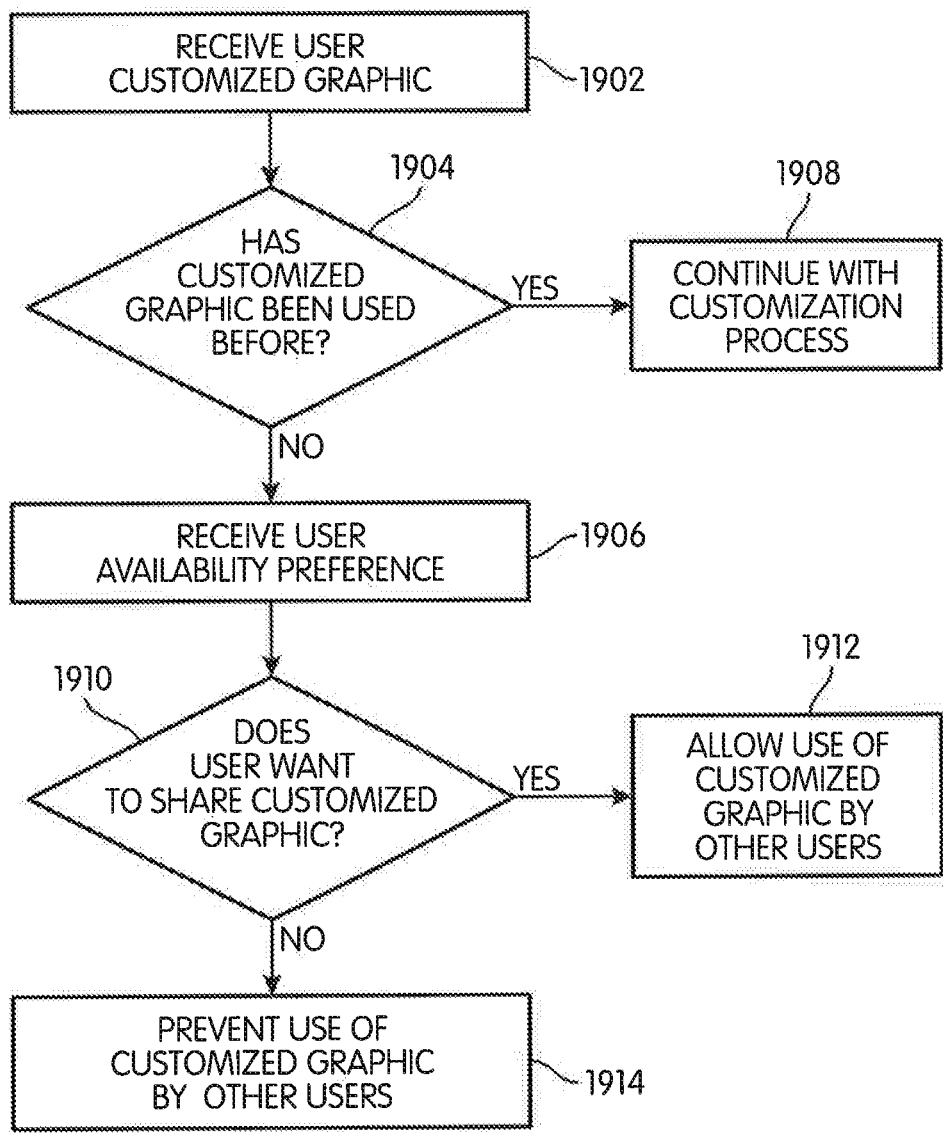
FIG. 24 is an embodiment of a process for allowing a user to select sharing preferences for a customized graphic.

FIG. 24 illustrates an embodiment of a process for providing a user with graphic sharing options. In some cases, some of the following steps could be performed by a graphical interface system. In other cases, some of the following steps could be performed by any other system, including any system associated with a proprietor. Moreover, in some cases, some steps may be performed by a graphical interface system while other steps could be performed by another system. It will be further understood that some of the following steps may be optional. In addition, the order of steps could vary in any manner in other embodiments.

In step 1902, a graphical interface system may receive a user customized graphic. The customized graphic may be created using any of the methods described above as well as any other known methods for making graphics. Next, in step 1904, the graphical interface system determines if the customized graphic has been used before. If the customized graphic has been used before, the system continues to step 1908 where the customization process is continued. In this case, the user does not have the option to select sharing preferences since the graphic is not unique to the user.

If, during step 1904, the graphical interface system determines that the customized graphic has not been used before, the system may proceed to step 1906. In step 1906, the system may receive a user availability preference. In some cases, the system can prompt the user with a message such as "would you like to share this image?" In other cases, the availability preference could be retrieved from a user profile or other previously stored information.

Next, in step 1910, the graphical interface system may determine if the user wants to share the customized graphic. This decision is based on the information received in step 1906. If the user has selected to share the graphic, the graphical interface system may proceed to step 1912. In step 1912, the graphical interface system allows the customized graphic to be used by other users or customers of the system.

If, during step 1910, the graphical interface system determines that the user does not want to share the customized graphic, the system may proceed to step 1914. In step 1914, the graphical interface system may prevent other users from using the customized graphic. It will be understood that a proprietor may use different methods for allowing a user to make a customized graphic exclusive. In some embodiments, a user may pay an extra fee to have a customized graphic excluded from future use by any other customers. In other cases, exclusivity of a customized graphic could be granted by the proprietor through any other means.

By allowing a user to share or not to share a customized graphic, the user is able to control the exclusivity of the customized graphic. Applying exclusive customized graphics to articles allows users to create unique or truly "one of a kind" articles.

While various embodiments have been described, the description is intended to be exemplary, rather than limiting and it will be apparent to those of ordinary skill in the art that many more embodiments and implementations are possible. Accordingly, the embodiments are not to be restricted except in light of the attached claims and their equivalents. Also, various modifications and changes may be made within the scope of the attached claims.

The invention claimed is:

1. A method of customization for an article, comprising:
providing a graphical interface system;
receiving information related to a plurality of different input graphics;
receiving, from the graphical interface system, a user input indicating a morphing input;
generating a morphed image based on the information related to the plurality of different input graphics and the morphing input, wherein the morphing input indicates a proportion of information to include in the morphed image from each input graphic of the plurality of different input graphics;
generating a graphical representation of a customized article comprising the morphed image; and
outputting the graphical representation of the customized article.

2. The method of claim 1, wherein the morphing input comprises a morphing percentage.

3. The method of claim 1, further comprising:
outputting a slider comprising an indicator that may be manipulated to control the morphing input, wherein the morphing input corresponds to a position of the indicator on the slider.

4. The method of claim 3, wherein the morphed image is an average of a first input graphic of the plurality of different input graphics and a second input graphic of the plurality of different input graphics, based on a determination that the indicator on the slider is positioned halfway between the first input graphic and the second input graphic.

5. The method of claim 3, wherein the morphed image is generated based on a first amount of information from a first input graphic and a second amount of information from a second input graphic, and wherein the first amount of information is greater than the second amount of information based on a determination that the indicator on the slider is positioned closer to the first input graphic than the second input graphic.

6. The method of claim 3, wherein the slider comprises a discrete set of indicator positions, each associated with a different morphed image.

7. The method of claim 1, wherein a position of the morphed image on the graphical representation of the customized article is determined based on a fourth user input.

8. The method of claim 7, wherein the position of the morphed image on the graphical representation of the customized article is limited to a set of predetermined ranges.

9. An apparatus comprising:
one or more processors; and
memory storing computer-executable instructions which, when executed by the one or more processors, cause the apparatus to:
provide a graphical interface system;

receive information related to a plurality of different input graphics
receive, from the graphical interface system, a user input indicating a morphing input;
generate a morphed image based on the information related to the plurality of different input graphics and the morphing input, wherein the morphing input indicates a proportion of information to include in the morphed image from each input graphic of the plurality of different input graphics;
generate a graphical representation of a customized article comprising the morphed image; and
output the graphical representation of the customized article.

10. The apparatus of claim 9, wherein the morphing input comprises a morphing percentage.

11. The apparatus of claim 9, the memory storing computer-executable instructions which, when executed by the one or more processors, cause the apparatus to:
output a slider comprising an indicator that may be manipulated to control the morphing input, wherein the morphing input corresponds to a position of the indicator on the slider.

12. The apparatus of claim 11, wherein the morphed image is an average of a first input graphic of the plurality of different input graphics and a second input graphic of the plurality of different input graphics, based on a determination that the indicator on the slider is positioned halfway between the first input graphic and the second input graphic.

13. The apparatus of claim 11, wherein the morphed image is generated based on a first amount of information from a first input graphic and a second amount of information from a second input graphic, and wherein the first amount of information is greater than the second amount of information based on a determination that the indicator on the slider is positioned closer to the first input graphic than the second input graphic.

14. The apparatus of claim 11, wherein the slider comprises a discrete set of indicator positions, each associated with a different morphed image.

15. The apparatus of claim 9, wherein a position of the morphed image on the graphical representation of the customized article is determined based on a fourth user input.

16. The apparatus of claim 15, wherein the position of the morphed image on the graphical representation of the customized article is limited to a set of predetermined ranges.

17. A non-transitory computer readable medium storing computer-executable instructions which, when executed by one or more processors, cause a computer to:
provide a graphical interface system;
receive information related to a plurality of different input graphics
receive, from the graphical interface system, a user input indicating a morphing input;
generate a morphed image based on the information related to the plurality of different input graphics and the morphing input, wherein the morphing input indicates a proportion of information to include in the morphed image from each input graphic of the plurality of different input graphics;
generate a graphical representation of a customized article comprising the morphed image; and
output the graphical representation of the customized article.

18. The non-transitory computer readable medium of claim 17, wherein the morphing input comprises a morphing percentage.

19. The non-transitory computer readable medium of claim 17, further storing computer-executable instructions which, when executed by one or more processors, cause the computer to:
output a slider comprising an indicator that may be manipulated to control the morphing input, wherein the morphing input corresponds to a position of the indicator on the slider.

20. The non-transitory computer readable medium of claim 19, wherein the morphed image is generated based on a first amount of information from a first input graphic and a second amount of information from a second input graphic, and wherein the first amount of information is greater than the second amount of information based on a determination that the indicator on the slider is positioned closer to the first input graphic than the second input graphic.

* * * * *